United States Patent
Etemad et al.

(10) Patent No.: US 7,476,367 B2
(45) Date of Patent: Jan. 13, 2009

(54) STACKED CATALYTIC REACTOR

(75) Inventors: Shahrokh Etemad, Trumbull, CT (US); Lance Smith, North Haven, CT (US)

(73) Assignee: Precision Combustion, Inc., North Haven, CT (US)

(*) Notice: Subject to any disclaimer, the term of this patent is extended or adjusted under 35 U.S.C. 154(b) by 454 days.

(21) Appl. No.: 11/111,307

(22) Filed: Apr. 20, 2005

(65) Prior Publication Data

US 2005/0191221 A1 Sep. 1, 2005

Related U.S. Application Data

(63) Continuation-in-part of application No. 09/953,136, filed on Sep. 15, 2001, now abandoned.

(51) Int. Cl.
- *B01J 8/02* (2006.01)
- *B01J 8/04* (2006.01)
- *B01J 8/00* (2006.01)
- *F28D 7/00* (2006.01)
- *F28D 7/02* (2006.01)

(52) U.S. Cl. .......... 422/211; 422/200; 422/188; 422/190; 422/196; 422/197; 422/198; 165/164; 165/165

(58) Field of Classification Search .......... 422/188, 422/190, 198, 187, 196, 197, 211, 236, 200; 165/164, 165, 166, 167

See application file for complete search history.

(56) References Cited

U.S. PATENT DOCUMENTS

| | | | | |
|---|---|---|---|---|
| 4,101,287 A | * | 7/1978 | Sweed et al. | 422/200 |
| 4,724,902 A | * | 2/1988 | Gross | 165/166 |
| 5,069,276 A | * | 12/1991 | Seidel | 165/166 |
| 5,417,938 A | * | 5/1995 | Shelden et al. | 422/196 |
| 5,473,082 A | * | 12/1995 | Shelden et al. | 549/258 |
| 5,525,311 A | * | 6/1996 | Girod et al. | 422/200 |
| 5,538,700 A | | 7/1996 | Koves | 422/200 |
| 5,540,899 A | * | 7/1996 | Koves | 422/200 |
| 5,600,052 A | * | 2/1997 | Girod et al. | 585/654 |
| 5,600,053 A | * | 2/1997 | Girod et al. | 585/654 |
| 5,700,434 A | * | 12/1997 | Gaiser | 422/173 |
| 5,762,887 A | * | 6/1998 | Girod et al. | 422/200 |
| 5,846,494 A | * | 12/1998 | Gaiser | 422/173 |
| 5,922,903 A | * | 7/1999 | Pujado | 562/98 |
| 6,019,170 A | * | 2/2000 | Yokoya et al. | 165/166 |

(Continued)

*Primary Examiner*—Walter D Griffin
*Assistant Examiner*—Huy-Tram Nguyen
(74) *Attorney, Agent, or Firm*—Robert L. Rispoli

(57) ABSTRACT

A stacked catalytic reactor is provided comprising of a plurality of housings, each housing defining a cavity having an entrance in fluid communication therewith, each housing further defining a plurality of first passages wherein each such first passage is in fluid communication with the cavity and each such first passage defines an exit. The plurality of housings are placed adjacent one to the other such that a second cavity and second passages are defined between successive housings, each second passage defines an exit, and the first passage exits and the second passage exits are interstratified and proximate one to the other. The stacked catalytic reactor employs backside cooling of a catalyst deposited therein in order to oxidize a fluid in the presence of a catalyst and transfer some heat of reaction into a second fluid and isolate the fluid to be reacted from the backside cooling fluid and then combine both fluids.

16 Claims, 3 Drawing Sheets

U.S. PATENT DOCUMENTS

| | | | |
|---|---|---|---|
| 6,132,689 A * | 10/2000 | Skala et al. | 422/193 |
| 6,168,765 B1 * | 1/2001 | Romatier et al. | 422/200 |
| 6,180,846 B1 * | 1/2001 | Dandekar et al. | 585/443 |
| 6,187,273 B1 * | 2/2001 | Gaiser | 422/173 |
| 6,190,624 B1 * | 2/2001 | Romatier | 422/200 |
| 6,228,341 B1 * | 5/2001 | Hebert et al. | 423/352 |
| 6,274,101 B1 | 8/2001 | Sechrist | 422/198 |
| 6,334,985 B1 * | 1/2002 | Raghuram et al. | 422/224 |
| 6,596,244 B1 * | 7/2003 | Pujado | 422/198 |
| 6,709,640 B1 * | 3/2004 | Romatier et al. | 422/200 |
| 6,749,817 B1 * | 6/2004 | Mulvaney, III | 422/200 |
| 6,869,578 B1 * | 3/2005 | Hebert et al. | 422/198 |

* cited by examiner

STACKED CATALYTIC REACTOR

CROSS-REFERENCE

This application is a continuation-in-part of U.S. patent application Ser. No. 09/953,136; filed Sep. 15, 2001 now abandoned, and incorporated herein by reference.

FIELD OF THE INVENTION

The present invention is generally directed to a catalytic reactor and is more specifically directed to a catalytic reactor wherein two fluid streams pass through first and second passages therethrough without mixing one with the other and the exits of the passages are positioned to support mixing of the two fluids streams as the streams exit the catalytic reactor.

BACKGROUND OF THE INVENTION

Catalytic reactors that employ catalytic oxidation methods can generate highly exothermic reactions; i.e. reactions that produce a significant quantity of energy in the form of heat. In reactors where a catalyst is positioned on a substrate, this heat may be sufficient to damage the substrate and/or the catalyst.

One strategy developed to protect the substrate and the catalyst is referred to as backside cooling. A backside-cooled substrate generally has two surfaces and permits heat to be conducted therebetween. In most catalytic reactors employing backside cooling, the catalyst is positioned on only one surface of the reactor. During operation, a first fluid to be reacted is passed over the surface with the catalyst and a second fluid, which could be the same as the first fluid, is passed over the other surface.

As heat is generated at the surface on which the catalyst is positioned, the heat is conducted through the substrate from one surface to the other where it is subsequently transferred to the second fluid. The substrate and catalyst therefore are maintained at a temperature below the temperature generated by the heat of reaction.

Some catalytic oxidation methods utilize first and second fluids that are different with the desire to mix these fluids after the first fluid has been oxidized in the presence of the catalyst, thereby forming a first reacted mixture. In particular, certain catalytic reactors have a first fluid that is suitable for the catalytic reaction and a second fluid that is not; e.g. the first fluid is a fuel/oxidant mixture containing the fuel that is to be oxidized to create a reacted mixture, and the second fluid comprises the oxidant.

One known catalytic oxidation method uses a first fluid that is fuel rich and a second fluid that is an oxidant for the fuel in the first mixture. A rich mixture is a mixture having a ratio, generally referred to as a fuel/air equivalence ratio, greater than one, wherein one represents a stoichiometric mixture. When the first mixture is rich, the reacted mixture produced when the first mixture is passed over the catalyst similarly will be rich. It should be noted that the catalytic reaction is limited by the amount of oxidizer present in the first mixture. Accordingly, the catalytic reaction will stop when the oxidizer is depleted to a given level that no longer supports catalytic oxidation. When a second fluid containing oxidant suitable to support oxidation of the fuel in the first fluid is combined with the reacted mixture, the oxidizer level is once again sufficient for the resumption of combustion. The preferred embodiment of such a fuel-rich catalytic reactor is described in detail in U.S. Pat. No. 6,394,791 to Smith, et al. ("the '791 patent"), which patent is incorporated herein by reference, particularly: Column 3, lines 35-42; Column 4, lines 20-62; Column 8, lines 33-37 and 47-54; and Column 12, line 31 to Column 13, line 21. A problem with such reactors is that the catalytic tube can be held in place only at one point. Thus, the tube may move and vibration can become an issue. Further, in these types of catalytic reactors, it is important that the reactor structure facilitate the rapid mixing of the reacted mixture with the second fluid to occur prior to autoignition.

Based on the foregoing, it is the general object of the present invention to provide a catalytic reactor that overcomes the above-identified problems and drawbacks of prior art reactors.

SUMMARY OF THE INVENTION

The stacked catalytic reactor of the present invention is comprised of a plurality of housings, each housing defining a cavity having an entrance in fluid communication therewith. Each housing further defines a plurality of first passages, each such first passage in fluid communication with the cavity and each such first passage having an exit. The plurality of housings are placed adjacent one to the other such that a second passage is defined between successive housings. Each second passage defines an exit. The first passage exits and the second passage exits are interstratified and proximate one to the other. In addition, a catalyst is positioned on at least one surface that defines the first passages. Thus, no individual catalyst tubes are required but a functional equivalent is provided.

The structure of the stacked catalytic reactor allows a first fluid to enter into a first cavity and pass through the first passages while simultaneously a second fluid enters a second cavity and passes through the second passages. The second fluid backside cools the first passage. By having multiple housings with the exits of the first and second passages interstratified and proximate, the first fluid and the second fluid are subdivided into smaller flows that will begin mixing immediately upon exiting the first and second exits and will mix more rapidly than two bulk flows. The structure also permits the entrances of the cavities to be in fluid communication thereby permitting a single fluid flow to be subdivided and enter each cavity.

Preferably, each housing is made from a first plate and a second plate, with the first plate being flat and the second plate being contoured. The second plate is placed next to the first plate and the edges sealed thereby defining the cavity and the first passages. An entrance in then defined into each cavity. The entrance can be formed through either plate or defined by the first plate in cooperation with the second plate. The use of contours in the plates is not required as wall structures could also be used.

The housings are placed adjacent one another such that a first plate of one housing is in contact with the second plate of the adjacent housing. The contours of the first plate of one housing in cooperation with the contours of the second plate of the adjacent housing define the second passages. As the contours of the first plate define at least a portion of both the exits of the first passages and the exits of the second passages, the exits by design are interstratified and proximate. At the exit plane, the first passage exits and the second passage exits actually are in fluid communication with one another to promote immediate mixing of the respective flow streams.

The catalyst is application-specific and can be positioned on either the first plate and/or the second plate in the area of the first passages. For backside cooling of the catalyst, the catalyst must be positioned within the first passage such that it is on a surface that is backside cooled. A surface that is backside cooled is a surface that defines a portion of a first passage with an opposing surface that defines a portion of second passage. It should be recognized that if the housings are stacked with the first side of one housing being adjacent to the second side of the adjacent housing, the surfaces that define the first passages on the boundaries will not be completely backside cooled unless additional structure is added. Positioning of the catalyst can be by deposition, alloying, or any other standard means.

The entrances of the housing may be in fluid communication one with the other. This may be accomplished by connecting the entrances to a common pipe. It is also possible to have entrance and exit combinations, such that a fluid flows through an exit of one cavity into an entrance of another cavity. It should be realized that there are numerous structures that can be used to place one cavity in fluid communication with another and the invention should not be limited by the structure depicted herein.

The passages, first or second, can be straight or have tortuosity. Tortuosity defines the configuration wherein the ratio of the length of the passage to the shortest possible length, i.e. straight, is greater than one. Shapes such as serpentine, zigzag and herringbone that would yield a tortuosity greater than one are considered within the scope of the invention. If tortuous passages are used, the contours must position the first and second passage exits so that the exits are interstratified and proximate.

As described above with respect to the Background of the Invention, the '791 patent teaches a catalytic oxidation method wherein the first fluid is fuel rich, having a fuel/air equivalence ratio greater than one, and the second fluid is an oxidant for the fuel in the first mixture. The first fluid is partially oxidized when passed over the catalyst and the reacted mixture produced similarly will be fuel rich. Because the catalytic reaction is limited by the amount of oxidizer present in the first mixture, the catalytic reaction will stop when the oxidizer is depleted to a given level that no longer supports catalytic oxidation. However, when the second fluid, which contains oxidant suitable to support oxidation of the fuel in the first fluid, is combined with the reacted mixture, the oxidizer level is once again sufficient for the resumption of combustion. As is desired, the catalytic reactor of the present invention provides a structure to facilitate the rapid mixing of the reacted mixture with the second fluid allowing mixing to occur prior to autoignition. The present invention provides a superior reactor design for such a combustion system, eliminating the shortcoming of the '791 patent design.

As described in the '791 patent at Column 12, lines 53-64, the catalyst coating employed in the present invention, where the fuel is a hydrocarbon and oxygen is the oxidizer, may have as an active ingredient precious metals, group VIII noble metals, base metals, metal oxides, or any combination thereof. Elements such as zirconium, vanadium, chromium, manganese, copper, platinum, palladium, osmium, iridium, rhodium, cerium, lanthanum, other elements of the lanthanide series, cobalt, nickel, iron, and the like may be used. The catalyst may be applied directly to the substrate, or may be applied to an intermediate bond coat or washcoat composed of alumina, silica, zirconia, titania, magnesia, other refractory metal oxides, or any combination thereof.

BRIEF DESCRIPTION OF THE DRAWINGS

The following drawings are provided to illustrate the invention.

DETAILED DESCRIPTION

Figure 1:
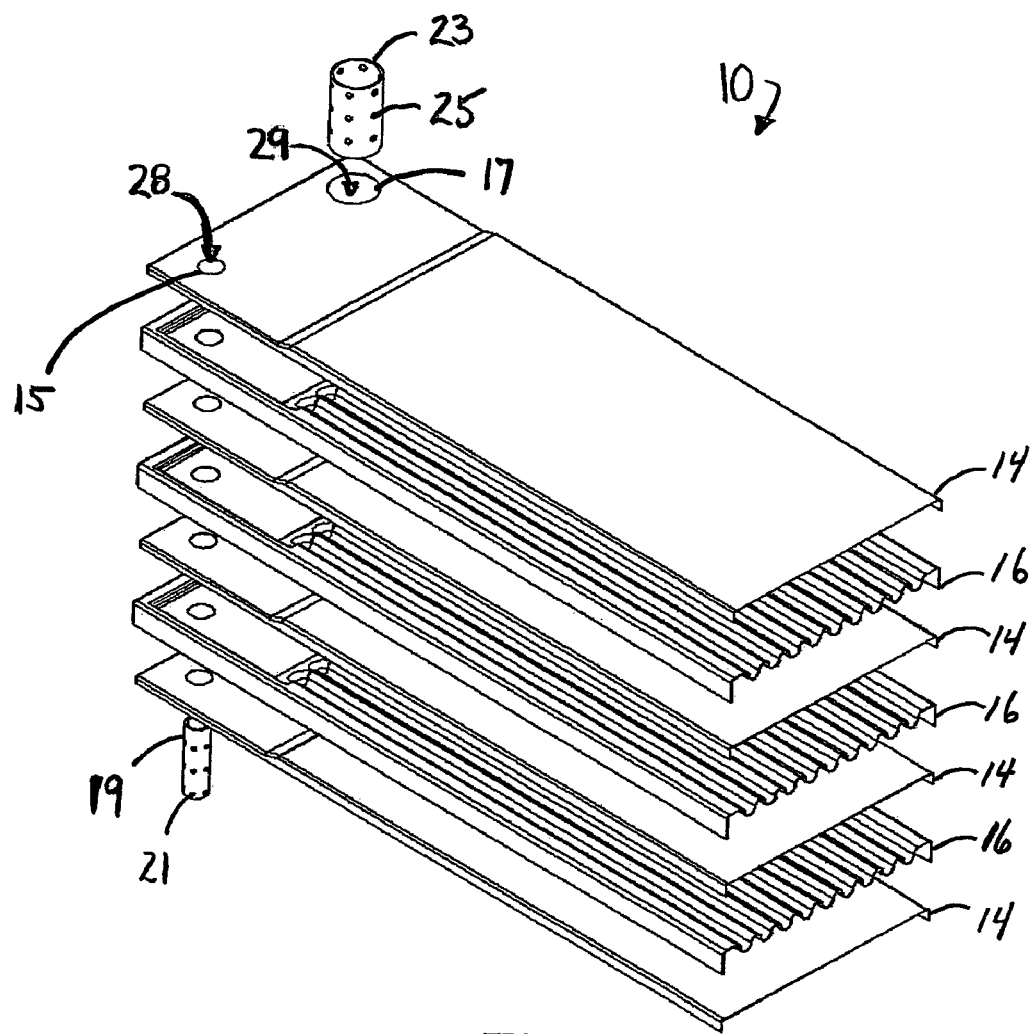
FIG. 1 is an exploded isometric view of a stacked catalytic reactor of the present invention.
Figure 2:
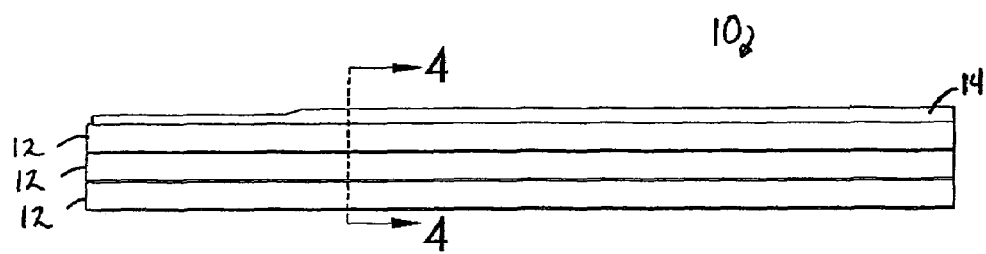
FIG. 2 is a profile view of a stacked catalytic reactor of the present invention.
Figure 4:
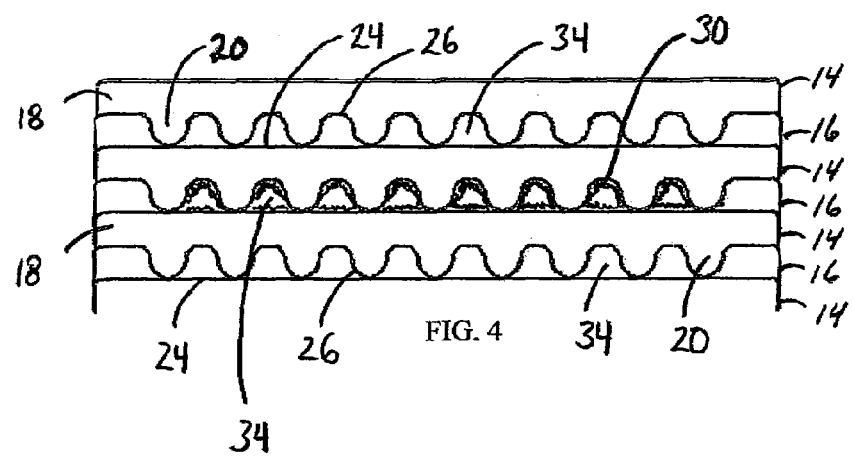
FIG. 4 is a cross sectional view of the stacked catalytic reactor of FIG. 2 taken along line 4-4.
Figure 5:
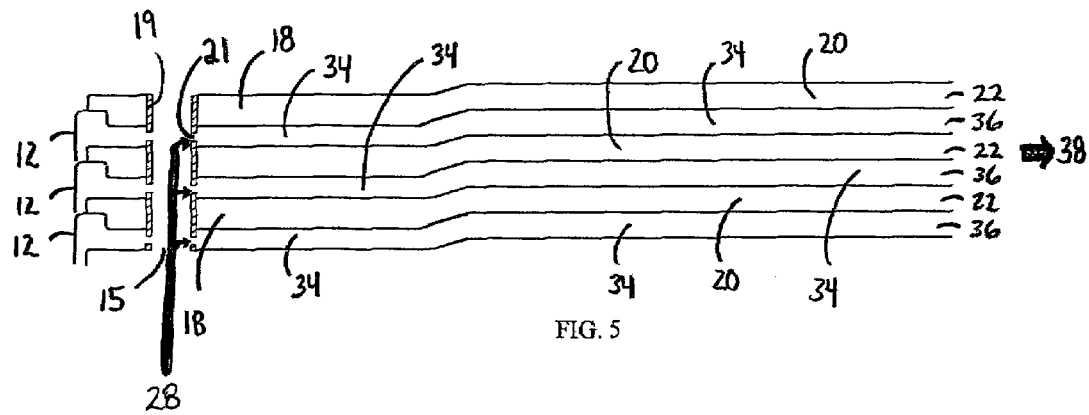
FIG. 5 is a cross sectional view of the stacked catalytic reactor of FIG. 3 taken along line 5-5.
Figure 6:
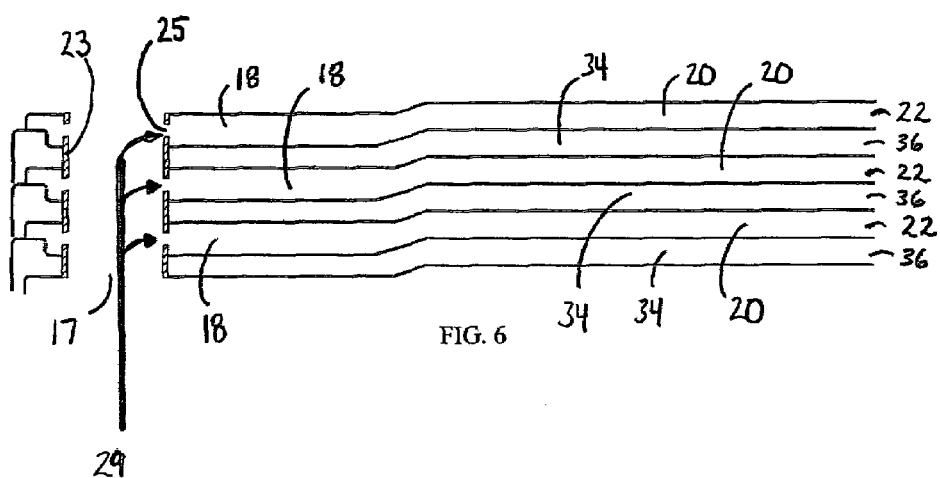
FIG. 6 is a cross sectional view of the stacked catalytic reactor of FIG. 3 taken along line 6-6.

As shown in FIG. 1 and FIG. 2, a stacked catalytic reactor generally denoted by reference number 10 comprises a plurality of housings 12. Each housing 12 is positioned adjacent one to the other. Continuing with FIG. 1, each housing 12 is comprised of a first plate 14 and a second plate 16. In a preferred embodiment of the present invention and as shown in FIG. 4, FIG. 5, and FIG. 6, the second plate 16 is corrugated and cooperates with first plate 14 to define cavity 18 and first passages 20 within cavity 18. When the housings 12 are stacked adjacent one another, the second plate 16 of one housing 12 cooperates with the first plate 14 of the adjacent housing 12 to define a second cavity that, in turn, defines second passages 34. First passages 20 each define an exit 22 and second passages 34 each define an exit 36. The edges where first plate 14 and second plate 16 meet are sealed by any suitable method such as, for example, welding, brazing, gluing, crimping.

Figure 3:
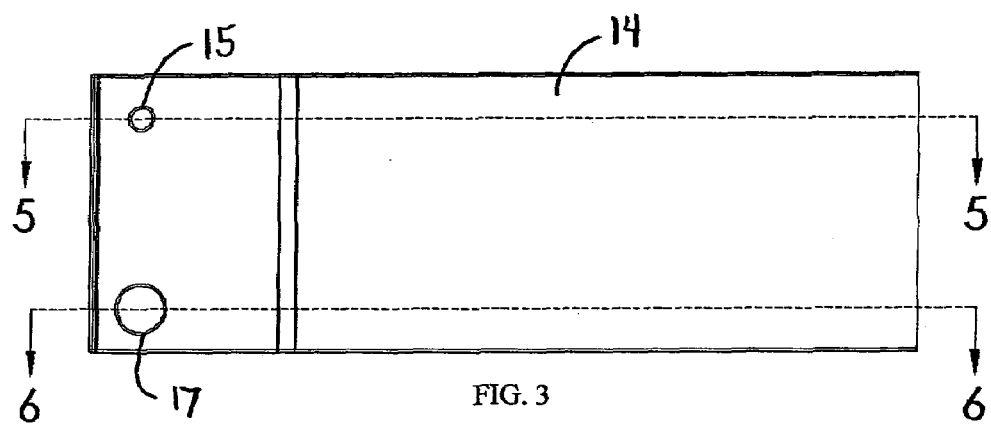
FIG. 3 is a plan view of a stacked catalytic reactor of the present invention.

Returning to FIG. 1 and FIG. 3, stacked catalytic reactor 10 further defines a fluid passageway 15 and a fluid passageway 17. Insert 19 defines a plurality of apertures 21 and insert 23 defines a plurality of apertures 25. As shown in FIG. 5, insert 19 is received in fluid passageway 15 such that apertures 21 are in fluid communication with passages 34. Similarly, as shown in FIG. 6, insert 23 is received in fluid passageway 17 such that apertures 25 are in fluid communication with passages 20. Accordingly, a fluid 28 enters fluid passageway 15 and insert 19, passes through apertures 21, passes into the cavity and, in turn, enters passages 34. Similarly, a fluid 29 enters fluid passageway 17 and insert 23, passes through apertures 25, passes into the cavity and, in turn, enters passages 20. Fluid 28 and fluid 29 are not permitted to mix within the respective reactor passages.

As depicted and described, respective inserts used in combination with first and second plates are provided such that a first fluid and a second fluid may pass through respective channels of the reactor without being permitted to mix. However, use of inserts and the described plate configuration should not be considered a limitation of the invention in that a series of interconnected entrances and exits, such as for example a manifold configuration, could be used to interconnect only the entrances of the respective first or second passages. As those skilled the art will appreciate, there are numerous ways to have fluid communication between the respective first and second passages.

As shown in FIG. 4, a catalyst 30 is positioned within passages 34. The catalyst 30 is positioned on first plate 14 and the second plate 16 such that the catalyst 30 is backside cooled. More specifically, catalyst 30 typically is positioned on a portion of first plate 14 and a portion of second plate 16 that defines a passage 34. As shown in FIG. 5, fluid 28 enters the cavity and, in turn, enters passages 34, and passes over catalyst 30. Fluid 28 typically comprises a fuel/air mixture that is partially oxidized when contacted with catalyst 30. Fluid 29 passes through passages 20 and provides backside cooling for passages 34.

It should be noted that second passages 34 located on the perimeter of stacked catalytic reactor 10 are not completely coated with catalyst when backside cooling of the catalyst is required. Where the anticipated catalytic reaction is such that backside cooling of the plates or the catalyst is not required, the catalyst 30 can be positioned on any surface defining a first passage 20 or a second passage 34.

As shown in FIG. 5 and FIG. 6, exits 22 of the first passages 20 and exits 36 of second passages 34 are interstratified and proximate one to the other. In operation, as described above, a bulk fluid 28 enters fluid passageway 15 and is subsequently subdivided into multiple flow streams passing through passages 34. Simultaneously, a bulk fluid 29 enters fluid passageway 17 and is subsequently subdivided into multiple flow streams passing through passages 20. Fluid 28 and fluid 29 are not permitted to mix within the respective reactor passages. These two flow streams combine upon exiting first passages 20 at exits 22, and second passages 34 at exits 36, to form fluid 38, as shown in FIG. 5. The first and second passages, 20 and 34, particularly at exits 22 and 36, respectively, are sized and positioned to permit rapid mixing, i.e. the passage exits act as jets.

While the first and second passages have been depicted as discrete and straight, the passages can have other shapes, i.e. be more tortuous. As previously described, the tortuosity is one if the flow path is straight, and the present invention may be configured such that the flow paths have tortuosities greater than one; i.e., may be curved, zigzag, serpentine, herringbone, and the like.

While preferred embodiments have been shown and described, various modification and substitutions may be made without departing from the spirit and scope of the invention. Specifically, the first and second passages have been shown as being defined by a generally flat first plate and a corrugated second plate. In another configuration, both the first plate and the second plate could be corrugated. Other structures such as walls or partitions could be used to define the passages. Accordingly, it is understood that the present invention has been described by way of example, and not by limitation.

What is claimed is:

1. A stacked catalytic reactor comprising:
   a plurality of housings;
   each housing defining a first cavity and having an entrance in fluid communication with the first cavity;
   each housing defining a plurality of first passages wherein each first passage is in fluid communication with the first cavity;
   each first passage having a first exit;
   the plurality of housings being positioned adjacent one to the other and defining at least one second cavity between successive housings and having an entrance in fluid communication with the second cavity;
   the second cavity defining a plurality of second passages wherein each second passage is in fluid communication with the second cavity;
   each second passage defining a second exit;
   the first exits and the second exits positioned interstratified and proximate one to the other; and
   a catalyst positioned on at least a portion of one surface defining the first passages;
   a first flow stream passing through at least one first passage wherein the first flow stream is catalytically reacted to form a reactant flow stream;
   a second flow stream passing through at least one second passage; and
   wherein the reactant flow stream and the second flow stream immediately mix upon exiting the reactor.

2. The stacked catalytic reactor of claim 1 wherein the catalyst comprises platinum.

3. The stacked catalytic reactor of claim 2 wherein the first flow stream is fuel rich.

4. The stacked catalytic reactor of claim 3 wherein the second flow stream comprises an oxidant.

5. The stacked catalytic reactor of claim 1 wherein the entrances to the cavities are in fluid communication with each other.

6. The stacked catalytic reactor of claim 1 wherein each housing is comprised of a first plate and a second plate, the first plate being contoured to define the first passages and the cavity.

7. The stacked catalytic reactor of claim 6 wherein the plurality of housings are arranged so that the first plate of one housing is positioned next to the second plate of the adjacent housing, the adjacent first and second plates cooperating to define a plurality of second passages.

8. The stacked catalytic reactor of claim 7 wherein the second plate is contoured.

9. The stacked catalytic reactor of claim 8 wherein the first plate and the second plate of a housing cooperate to make the first passages tortuous.

10. The stacked catalytic reactor of claim 9 wherein the first plate and adjacent second plate cooperate to make the second passages tortuous.

11. The stacked catalytic reactor of claim 4 wherein the entrances to the cavities are in fluid communication with each other.

12. The stacked catalytic reactor of claim 4 wherein each housing is comprised of a first plate and a second plate, the first plate being contoured to define the first passages and the cavity.

13. The stacked catalytic reactor of claim 12 wherein the plurality of housings are arranged so that the first plate of one housing is positioned next to the second plate of the adjacent housing, the adjacent first and second plates cooperating to define a plurality of second passages.

14. The stacked catalytic reactor of claim 13 wherein the second plate is contoured.

15. The stacked catalytic reactor of claim 14 wherein the first plate and the second plate of a housing cooperate to make the first passages tortuous.

16. The stacked catalytic reactor of claim 15 wherein the first plate and adjacent second plate cooperate to make the second passages tortuous.

\* \* \* \* \*